United States Patent [19]

Morikawa

[11] 4,293,189

[45] Oct. 6, 1981

[54] LIGHT REFLECTING DEVICE

[75] Inventor: Yoshiharu Morikawa, Toyonaka, Japan

[73] Assignee: Solid Corporation, Hyogo, Japan

[21] Appl. No.: 22,106

[22] Filed: Mar. 20, 1979

[30] Foreign Application Priority Data

Mar. 31, 1978 [JP] Japan .............................. 53-42826[U]
Nov. 10, 1978 [JP] Japan ............................ 53-154731[U]
Nov. 10, 1978 [JP] Japan ............................ 53-154732[U]

[51] Int. Cl.³ ............................................ G02B 5/128
[52] U.S. Cl. ..................................... 350/105; 350/97; 301/37 SA
[58] Field of Search ........................ 350/97, 102–109; 428/544; 260/24; 427/4, 36, 54, 32, 24, 25, 29, 30, 31

[56] References Cited

U.S. PATENT DOCUMENTS

| | | | |
|---|---|---|---|
| 3,140,340 | 7/1964 | Weber | 350/105 |
| 3,288,618 | 11/1966 | De Vries | 350/105 |
| 3,355,311 | 11/1967 | Gosselink | 350/105 |
| 3,614,199 | 10/1971 | Altman | 350/105 |
| 3,700,305 | 10/1972 | Bingham | 350/105 |
| 3,716,445 | 2/1973 | Lemelson | 350/102 |
| 3,758,192 | 9/1973 | Bingham | 350/105 |
| 3,801,183 | 4/1974 | Sevelin et al. | 350/109 |
| 3,913,520 | 10/1975 | Berg et al. | 427/36 |
| 4,012,114 | 3/1977 | Eigenmann | 350/104 |
| 4,025,159 | 5/1977 | McGrath | 350/105 |
| 4,125,644 | 11/1978 | Keltey et al. | 427/36 |

FOREIGN PATENT DOCUMENTS 402811 12/1933 United Kingdom .................. 427/36

OTHER PUBLICATIONS

Reflective Sheeting sales brochure (in Japanese).

*Primary Examiner*—John K. Corbin
*Assistant Examiner*—B. W. delos Reyes
*Attorney, Agent, or Firm*—Larson and Taylor

[57] ABSTRACT

A light reflecting device comprising a light reflecting surface and fine spherical glass beads arranged in front of the reflecting surface. The device comprises a light transmitting layer covering the glass beads and having an outer surface which is not planar but includes projections and indentations substantially conforming to the contours of the glass beads so that the device can be observed with extreme ease and distinctness not only from the position of the light source or the vicinity thereof but also from other positions.

13 Claims, 12 Drawing Figures

A-A

LIGHT REFLECTING DEVICE

This invention relates to light reflecting devices comprising a light reflecting surface and fine spherical glass beads arranged in front of the reflecting surface, and more particularly to such light reflecting devices provided in combination with components of umbrellas, earrings, necklaces, bracelets, buttons and like ornaments, lures for fishes including cuttlefish, parts of bicycles and like vehicles, driver's helmets, spoke covers for bicycles, etc.

Light reflecting devices having a light reflecting surface and fine spherical glass beads arranged in front of the reflecting surface are commercially available in the form of a light reflecting sheet.

As will be apparent from FIG. 1 illustrating the principle of the light reflecting sheet, the sheet comprises a supporting sheet S, a suitable light reflecting surface M formed on a surface of the sheet, fine spherical transparent glass beads G disposed in a dispersed arrangement and spaced apart from the reflecting surface M by a distance substantially equal to the focal distance of the glass beads, and a transparent synthetic resin layer L completely covering the glass beads and having a planar outer surface l.

The term "focal distance of the glass beads" as used throughout the specification and claims refers to a distance between the surface of a glass bead and the focal point of the glass bead which is generally called "focal distance of glass beads" among those skilled in the art.

Because in the foregoing conventional light reflecting sheet, the distance between the light reflecting surface M and the glass beads G is substantially equal to the focal distance of the glass beads and because the glass beads G are fully embedded in the synthetic resin layer L with the planar outer surface l, almost all of the incident rays P passing through the glass beads are reflected as rays Q parallel to the corresponding incident rays P and return toward the light source.

This means that a person positioned at or near the light source can easily clearly recognize the presence of the reflecting sheet or an article bearing the sheet, whereas there is the likelihood that those at other locations will be unable to observe the sheet or article.

Accordingly when such a reflecting sheet is attached to umbrellas, ornaments, bicycles, traffic signs, etc. to ensure safety of traffic for pedestrians, bicycle riders and motor vehicle drivers, it is not always fully useful.

Further when the reflecting sheet is used for fishing as attached to lures with light projected thereon in an attempt to achieve an improved result, the lures will have difficulty in arresting the attention of many of the fishes wandering about under water for the same reason as stated above.

Additionally when the reflecting sheet is affixed to a curved surface of an article as seen in FIG. 1, of the incident rays $P_1$ that strike the curved surface tangentially or nearly tangentially thereof, some are diffusedly reflected from the sheet, or some are reflected from the outer surface l of the resin layer L which is smooth-surfaced and travel forward, or some pass through the sheet. As a result, it becomes difficult for the observer to identify the contours of the article.

This also indicates that the reflecting sheet is not satisfactory for use with lures or as means for assuring safety in traffic.

The main object of this invention is to provide a light reflecting device which reflects some of the rays incident thereon from the substantially entire area of its irradiated surface and returns the rays toward the light source and/or vicinity thereof and which diffusedly reflects the other incident rays toward various directions from the substantially entire area of the irradiated surface so that the reflecting device can be observed with extreme ease and distinctness not only from the position of the light source or the vicinity thereof but also from other positions.

To fulfil this object, this invention provides a light reflecting device comprising a support member, a light reflecting layer formed on the support member and having a light reflecting surface, substantially transparent fine spherical glass beads having a high refractive index and spaced from the light reflecting surface by a distance approximately equal to the focal distance of the glass beads, and a light transmitting layer covering the glass beads and the light reflecting layer and having an outer surface including projections and indentations substantially conforming to the contours of the glass beads. The invention further provides a light reflecting device in combination with an article selected from among components of umbrellas, ornaments including earrings, necklaces, bracelets and buttons, fishing lures, components of vehicles including bicycles, driver's helmets, traffic signs and detachable spoke covers for bicycles having a groove for receiving a spoke coextensively as placed therein transversely of the length of the spoke and a channel formed at the bottom of the groove for fittingly accommodating the spoke, the light reflecting device comprising a light reflecting layer formed on at least part of the article and having a light reflecting surface, substantially transparent fine spherical glass beads having a high refractive index and spaced from the light reflecting surface by a distance approximately equal to the focal distance of the glass beads, and a light transmitting layer covering the glass beads and the light reflecting layer and having an outer surface including projections and indentations substantially conforming to the contours of the glass beads.

These and other objects, features and benefits of this invention will become apparent from the following detailed description of embodiments with reference to the accompanying drawings which are given for illustrative purposes only. It is to be understood that the invention is not limited to the devices shown in the drawings. In the drawings.

Figure 1:
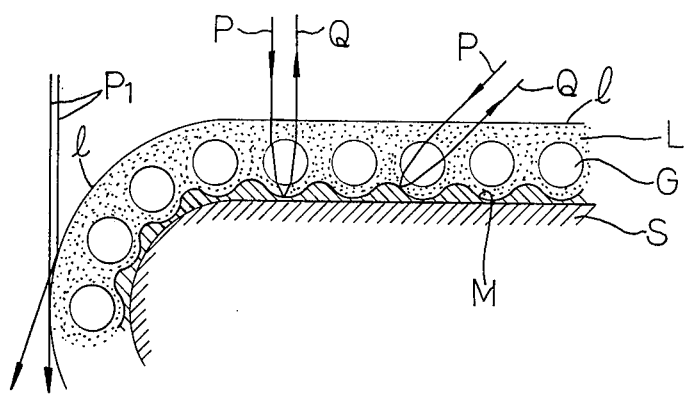
FIG. 1 is a view in section illustrating the principle of a conventional light reflecting sheet.
Figure 2:
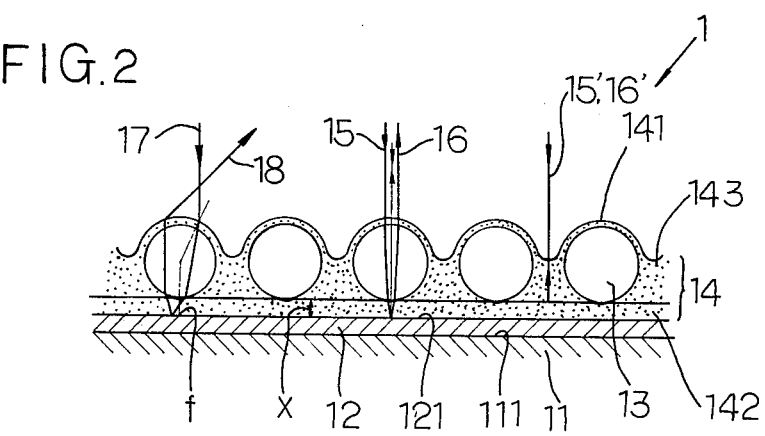
FIG. 2 is a sectional view showing an embodiment of the invention.

With reference to FIG. 2, a light reflecting device 1 comprises a support member 11 having a planar surface 111, a light reflecting layer 12 formed on the surface 111 and having a light reflecting surface 121, substantially transparent fine spherical glass beads 13 having a high refractive index and positioned away from the light reflecting surface 121 by a distance approximately equal to the focal distance X of the glass beads, and a light transmitting covering layer 14 covering the glass beads 13 and the light reflecting layer 12 and formed with an outer surface 141 having projections and indentations substantially conforming to the contours of the glass beads 13.

The support member 11 is made of iron, and the surface 111 has substantial smoothness. The reflecting layer 12 is a chromium layer formed by electroplating and has an outer surface serving as the light reflecting surface 121. The glass beads 13 are substantially colorless and transparent and have substantially the same diameter in the range of about 10 to about 100 microns and a refractive index of at least about 2.0. The covering layer 14 is composed of a first layer 142 and a second layer 143 which are formed from a melamine resin coating composition. The first layer 142 is formed by applying the composition to the plating layer 12 to a thickness approximately equal to the focal distance of the glass beads. Before the first layer dries, glass beads 13 are applied to the first layer 142 as dispersed thereover. The glass beads are applied by a suitable known method as by scattering with the hand, floating or electrostatic powder coating. The term "floating" herein used refers to a method which employs an oscillator box provided with a stretched fabric as its bottom, such that compressed air is applied to the fabric from therebelow with glass beads placed on the fabric to suspend the beads in the interior air and apply them to the desired article placed into the box. The first layer 142 bearing the glass beads thereon is baked. Subsequently the second layer 143 is formed over the first layer 142 and the glass beads 13 and then baked. The second layer 143 serves to retain and protect the glass beads 13.

Accordingly, an incident ray 15 substantially perpendicular to the light reflecting surface 121 and travelling toward the center of a glass bead or the vicinity thereof passes through the second layer 143, glass bead 13 and first layer 142. Another incident ray 15' perpendicular to the light reflecting surface 121 and travelling toward a portion other than the glass beads passes through the second and first layers. These rays 15 and some of rays 15' strike the light reflecting surface 121 which is substantially at the focus position of the glass beads, whereupon they are reflected from the surface 121 as rays 16 and 16' and return toward the light source or the vicinity thereof. Incident rays 17, which are substantially perpendicular to the light reflecting surface 121, but travel toward the portions of the glass beads other than the centers of the beads, are diffusedly reflected in various directions, because since the outer surface of the covering layer 14, namely the outer surface of the second layer 143, is curved in conformity with the shape of the glass beads 13, the incident rays 17 after passing through the first layer 142 are no longer perpendicular to the light reflecting surface 121 and are therefore reflected from the surface 121 at positions other than the focus positions of the glass beads 13. The curved outer surface of the layer 143 provides greatly diffused reflection, rendering the device 1 easily distinctly observable from various directions as well as from the position of the light source and the vicinity thereof.

Figure 3:
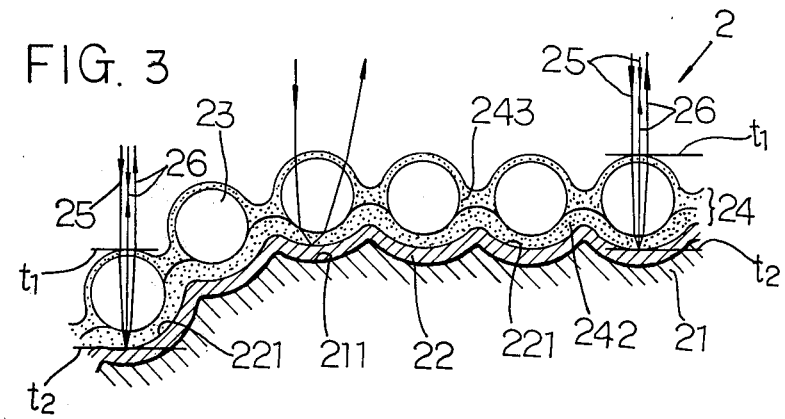
FIG. 3 is a sectional view showing another embodiment of the invention.

When rays are projected obliquely on the light reflecting device or when the support member has a curved surface even if rays are projected from the front, the device preferably has a rough light reflecting surface 221 as shown in FIG. 3, because it is optically apparent that rays incident on a smooth reflecting surface at an angle of inclination are almost unlikely to return toward of the light source concerned.

Although the light reflecting device 2 shown in FIG. 3 is made from the same materials as the device 1 shown in FIG. 2, the light reflecting surface 221 has a surface roughness in the range of about 10 to about 100 microns. FIG. 3 shows an iron support member 21, a light reflecting layer 22 formed by chromium electroplating and having an outer surface serving as the light reflecting surface 221, glass beads 23 and a light transmitting covering layer 24 composed of first and second layers 242 and 243 each in the form of a baked melamine resin coating. The rough reflecting surface 221 can be formed by subjecting the support member 21 to suitable surface treatment to form a surface 211 having a roughness in the range of about 10 to about 100 microns and plating the resulting surface. While the light reflecting surface 221 may have a roughness outside the above-mentioned range, the surface roughnesses within the specified range have been found suitable for effecting the desired reflection of light to fulfil the object of this invention.

To render the reflected light returnable with an improved efficiency, it is desirable that the glass beads 23 be so sized as to be fittable in the dents of the light reflecting surface 221. Some of the glass beads 23 will then snugly fit in these dents, giving a correspondingly increased surface area to the light reflecting surface at the focus position of glass beads to render reflected rays returnable with enhanced effectiveness.

As will be apparent from FIG. 3, an incident ray 25, which is substantially perpendicular to a tangent plane $t_1$ of the outer surface of the covering layer 24 at an optional position and to a tangent plane $t_2$, parallel to the plane $t_1$, of the reflecting surface 221 at the focus position of the glass bead concerned and which travels toward the center of the bead or its vicinity, is reflected as a ray 26 and returns toward the light source or the vicinity thereof. Almost all of incident rays passing through other portions than the centers of the beads or the vicinity thereof are diffusedly reflected in various directions. It will be readily understood that the outer surface of the covering layer 24 causes markedly diffused reflection because it has projections and indentations.

To render the reflected rays returnable effectively, it is desired that the glass beads 13 and 23 have a refractive index of at least about 2.0, preferably at least about 2.2.

In order to permit the light reflecting device to provide satisfactorily returnable reflected rays and diffusedly reflected rays over the entire irradiated surface thereof, it is preferred that the device has a large number of glass beads per unit area. With the convenience of handling also considered, it is favorable to use glass beads ranging from about 10 to about 100 microns in diameter. While all the glass beads to be incorporated into the device need not be of the same size, it is advantageous to use glass beads of substantially identical size since there is the need to position the beads away from the reflecting surface by a distance approximately equal to the focal length of the bead. Of numerous glass beads used, some may be otherwise positioned, whereas such beads will contribute to the diffused reflection of light.

The description given above of the glass beads is also true of the other embodiments to be described later.

The chromium plating layers 12 and 22 serving as light reflecting layers in the embodiments of FIGS. 2 and 3 are replaceable by other layers having light reflecting properties and formed by electroplating, vacuum plating, chemical plating or some other plating process. A chromium electroplating layer, a composite layer of zinc electroplating layer and unichrome layer, and aluminum plating layer formed by vacuum evaporation are available relatively inexpensively. Silver mirror reaction and nickel chemical plating appear useful as chemical plating processes. The desired plating process may be selected for use in accordance with the material of the support member on which the light reflecting layer is to be formed. When the support member is made of stainless steel, aluminum alloy or the like which is light-reflective, the outer surface itself of the support member is usable as a light reflecting surface.

The first and second melamine resin coating layers providing the covering layers 14 and 24 in the embodiments of FIGS. 2 and 3 are replaceable by layers of other synthetic resin or lacquer, such as nitrocellulose lacquer, having light transmitting properties. Such synthetic resin layers can be formed, for example, from acrylic, polyurethane, alkyd or like synthetic resin coating composition, or from nylon, polyester or like resin coating composition which is curable with ultraviolet rays. When the first and second layers are formed from synthetic resin coating compositions such as melamine resin and acrylic resin compositions, at least one of the layers may preferably be finished by baking so as to have improved durability. However when the applied composition can be spontaneously dried, the wet coating may be made to spontaneously dry with heating as in the case of polyurethane, acrylic resin and alkyd resin coating compositions.

In view of the refractive index and ease of manufacture, the first and second layers may preferably be made from the same material, but different materials are usable insofar as the light reflecting device obtained has the desired light reflecting ability, strength, durability, etc. For example, the first layer formed by applying a melamine resin coating composition followed by baking may be combined with the second layer formed by applying an acrylic or polyurethane resin coating composition followed by spontaneous drying, or the first layer made from an acrylic resin coating composition may be in combination with the second layer formed from a melamine or polyurethane resin coating composition.

At least one of the first layer 142 (242), second layer 143 (243) and glass bead component 13 (23) according to the embodiments described above may be colored with a known transparent pigment or dye suitable to the use of the light reflecting device to be obtained, without substantially impairing the desired light transmitting properties. When at least two of the first layer, second layer and glass beads are to be colored, they may be colored in the same color or different colors. When such components are colored differently, the device will appear differently in accordance to the direction in which it is observed.

Figure 4:
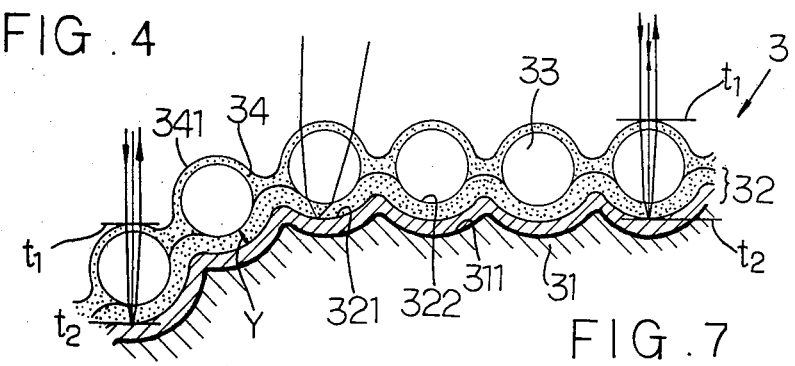
FIG. 4 is a sectional view showing still another embodiment of the invention.

FIG. 4 shows a light reflecting device 3 comprising a support member 31 having a surface 311, a light reflecting layer 32 formed on the surface 311 and having a light reflecting surface 321, substantially transparent fine spherical glass beads 33 having a high refractive index and positioned away from the light reflecting surface 321 by a distance approximately equal to the focal distance of the glass beads, and a light transmitting covering layer 34 covering the glass beads 33 and the light reflecting layer 32 and formed with an outer surface 341 having projections and indentations substantially conforming to the contours of the glass beads 33.

The support member 31 is made of metal, synthetic resin, wood, rubber or the like, and its surface 311 has a roughness in the range of about 10 to about 100 microns. The reflecting layer 32 is made from a transparent acrylic resin coating composition containing an aluminum powder which is preferably of the perfectly non-leafing type. The aluminum powder layer formed in the coating layer 32 has a surface which serves as the light reflecting surface 321. The reflecting surface 321 also has a roughness in the range of about 10 to about 100 microns in accordance with the surface roughness of the support member 31. The thickness Y of the coating from the outer surface 322 of the coating layer 32 to the reflecting surface 321 is substantially equal to the focal distance X of the glass beads. Before the coating layer 32 cures, the glass beads 33 are applied onto the layer 32 as dispersed thereover. The coating layer 32 is thereafter dried with heating at about 40° C. An acrylic resin coating composition is thereafter applied to the layer 32 and glass beads 33 and dried to form the covering layer. Preferably the glass beads 33 have a refractive index of at least about 2.0 and are sized to fit in dents of the light reflecting surface 321.

It will be readily understood that the light reflecting device 3 resembles the device 2 shown in FIG. 3 in function and effects, with the exception that since the light reflecting surface 321 is the surface of a layer of randomly arranged aluminum particles (not shown), the device 3 has a correspondingly enhanced effect of causing diffused reflection.

The light reflecting surface 321 need not always have the above-mentioned roughness in the range of about 10 to about 100 microns but may be substantially smooth if suitable for the use of the device contemplated.

In place of the aforesaid aluminum powder, other light reflecting powders are usable such as brass and like copper alloy powder and mica powder.

The acrylic resin coating layers serving as the light reflecting layer 32 and the covering layer 34 of the embodiment shown in FIG. 4 are replaceable by other synthetic resin layers having light transmitting properties and prepared from polyurethane, alkyd, melamine and like resin coating compositions or from nylon, polyester and like resin coating compositions which are curable with ultraviolet rays. Alternatively the layers may be formed from lacquers such as nitrocellulose lacquer. At least one of the layers 32 and 34 may preferably be finished by baking. As is the case with the first and second layers of the light reflecting devices shown in FIGS. 2 and 3, the light reflecting resin layer 32 and the covering resin layer 34 are preferably formed from the same material.

At least one of the light reflecting layer 32, covering layer 34 and glass bead component 33 may be colored without sacrificing their light transmitting properties.

The coating layers can be formed easily by a known process such as compressed air spray, airless spray or electrostatic coating process.

The present invention further provides light reflecting devices in combination with component parts of umbrellas, ornaments, lures, parts of vehicles, driver's helmets, spoke covers for bicycles, traffic signs and the like which serve as support members on which light reflecting layers are to be formed.

Figure 5:
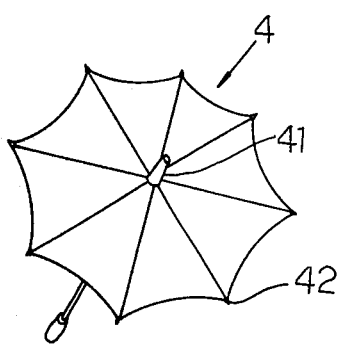
FIG. 5 is a perspective view showing an umbrella provided with the light reflecting device of the invention.
Figure 7:
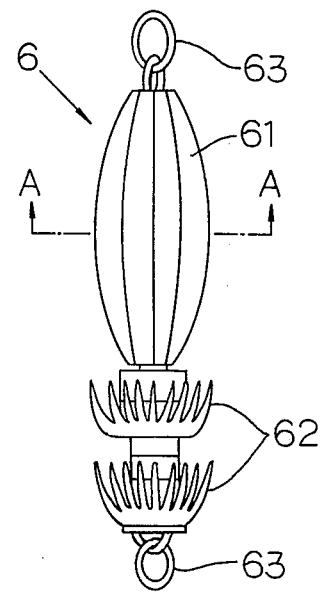
FIG. 7 is a front view showing a lure equipped with the light reflecting device of this invention for fishing cuttlefish.
Figure 6:
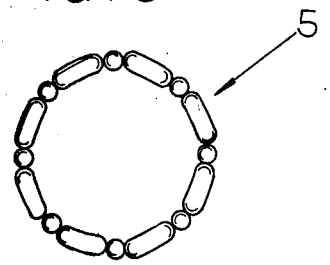
FIG. 6 is a front view showing a bracelet equipped with the light reflecting device of the invention.
Figure 8:
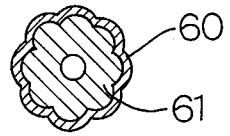
FIG. 8 is a view in section taken along the line A—A in FIG. 7.
Figure 9:
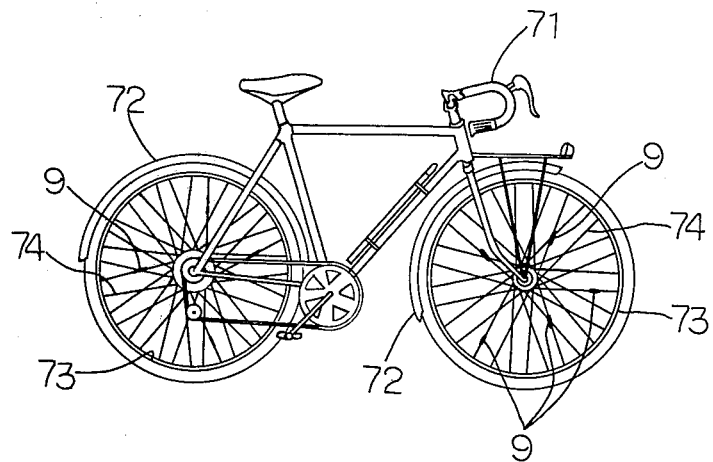
FIG. 9 is a side elevation showing a bicycle equipped with the light reflecting device of this invention.
Figure 10:
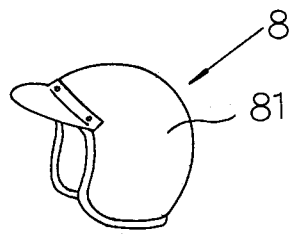
FIG. 10 is a perspective view showing a driver's helmet equipped with the light reflecting device of the invention.

FIG. 5 shows an umbrella 4 having a light reflecting device attached to each of a cap 41 at the stem top and ends of ribs 42. FIG. 6 shows a bracelet 5 as an ornament provided with a light reflecting device in its entirety. FIGS. 7 and 8 show a lure 6 for fishing cuttlefish with a light reflecting device 60 attached to a lure portion 61. FIG. 7 shows fishing hooks 62 and a metal connector ring 63. FIG. 9 shows a bicycle with a light reflecting device attached to each of its handle 71, mudguard 72, rims 73, spokes 74, etc. FIG. 10 shows a driver's helmet 8 entirely covered with a light-reflecting device as at 81. A spoke cover 9 for bicycles provided with a light reflecting device 90 is shown in FIGS. 11 and 12, and also in FIG. 9 as indicated at 9.

Figure 11:
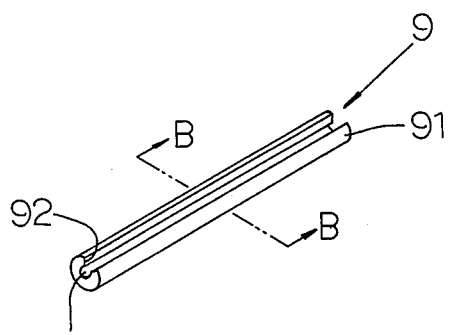
FIG. 11 is a perspective view showing a spoke cover for bicycles equipped with the light reflecting device of the invention.
Figure 12:
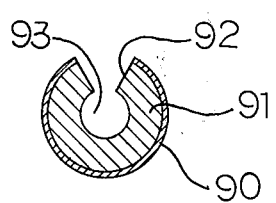
FIG. 12 is a view in section taken along the line B—B in FIG. 11.

Preferably the spoke cover 9 shown in FIGS. 11 and 12 is made as light as possible. It is in the form of a rod 91 made of elastic material such as rubber or synthetic resin and is formed with a longitudinal groove 92 of V-shaped cross section. A spoke is insertable into the groove 92 in a transverse direction with respect to the length of the spoke. A channel 93 of circular cross section is formed at the bottom of the groove 92 to detachably accommodate the spoke therein.

The light reflecting layer of the device of this invention in combination with an article such as an umbrella as described above is the outer surface layer itself of the article, a plating layer or layer of coating composition containing a powder having light reflecting properties, depending on the material of the surface of the article on which the reflecting layer is to be formed. The covering layer covering the light reflecting layer and glass beads comprises a first and a second layer when the surface layer of the article or plating layer serves as the reflecting layer, or is a single coating layer when the reflecting layer comprises a layer of coating composition cotaining a light-reflective powder as already described above.

I claim:

1. A light reflective device comprising:
   a support member having a surface having a substantially constant roughtness defining dents within the range of 10 to 100 microns;
   a continuous light reflecting layer covering the support member surface and having a light reflecting outer surface coextensive with and formed in conformity with the contours of the underlying ueven dented surface of the support member, said light reflecting outer surface thus having a substantially constant roughess defining dents within the range of 10 to 100 microns;
   substantially transparent fine spherical glass beads having a high refractive index and spaced from the light reflecting surface by a distance approximately equal to the focal distance of the glass beads, the glass beads being sized to fit in dents of the light reflecting surface; and
   a resin layer covering the glass beads and light reflecting layer, said resin layer comprising a first layer portion and a second layer portion each having light transmitting properties and each comprising a synthetic resin, the first layer portion having a thickness approximately equal to the focal distance of the glass beads and covering the light reflecting layer, the glass beads being dispersed over the first layer portion whereby the glass beads are spaced from the light reflecting layer by a distance approximately equal to the focal distance of the glass beads, the second layer portion covering the first layer portion and the glass beads and forming an outer surface having projections and indentations substantially conforming to the contours of the glass beads.

2. A light reflective device according to claim 1 wherein said light reflecting layer comprises a metal layer plated onto said surface of said support member.

3. A light reflective device according to claim 2 wherein said synthetic resin is capable of being cured by baking.

4. A light reflective device according to claim 3 wherein said resin layer is cured by baking.

5. A light reflective device according to claim 2 wherein the plated metal layer is formed by electroplating, vacuum plating or chemical plating.

6. A light reflective device according to claim 1 wherein said light reflecting layer comprises a layer of synthetic resin containing a light reflecting powder.

7. A light reflective device according to claim 6 wherein the light-reflecting powder is an aluminum powder, copper alloy powder, or mica powder.

8. A light reflective device according to claim 1 wherein said glass beads have a refractive index of at least about 2.0.

9. A light reflective device according to claim 1 wherein said glass beads have substantially the same diameter in the range of about 10 to 100 microns.

10. A light reflective device according to claim 1 wherein at least one of the first and second layer portions and said glass beads is colored without substantially impairing the light transmitting properties thereof.

11. In an article having a light reflective device in combination therewith, the improvement wherein the light reflecting device comprises a device as defined in claim 1.

12. An article according to claim 11 selected from the group consisting of umbrellas, ornaments, fishing lures, components of vehicles, driver's helmets, and traffic signs.

13. An article according to claim 11 wherein the article itself comprises a light reflecting portion which constitutes said light reflecting device.

* * * * *